United States Patent
Kwak et al.

(10) Patent No.: US 9,774,567 B2
(45) Date of Patent: Sep. 26, 2017

(54) SYSTEM, SERVER APPARATUS, TERMINAL APPARATUS, AND RECORDING MEDIUM FOR GENERATING A USER AFFINITY-BASED ADDRESS BOOK, AND METHOD FOR GENERATING A USER AFFINITY-BASED ADDRESS BOOK

(75) Inventors: Kiwon Kwak, Seongnam-si (KR); Eun Bok Lee, Seoul (KR); In Seong Hwang, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 730 days.

(21) Appl. No.: 14/128,374

(22) PCT Filed: Jun. 28, 2012

(86) PCT No.: PCT/KR2012/005126
§ 371 (c)(1),
(2), (4) Date: Dec. 20, 2013

(87) PCT Pub. No.: WO2013/002574
PCT Pub. Date: Jan. 3, 2013

(65) Prior Publication Data
US 2014/0115083 A1  Apr. 24, 2014

(30) Foreign Application Priority Data

Jun. 28, 2011 (KR) .................. 10-2011-0063108

(51) Int. Cl.
*G06F 15/16* (2006.01)
*H04L 29/12* (2006.01)
(Continued)

(52) U.S. Cl.
CPC ....... *H04L 61/3015* (2013.01); *G06Q 10/101* (2013.01); *G06Q 10/107* (2013.01); *G06Q 50/01* (2013.01)

(58) Field of Classification Search
CPC .................................................. H04L 61/3015
(Continued)

(56) References Cited

U.S. PATENT DOCUMENTS

| 2005/0075917 A1* | 4/2005 | Flores ........... G06Q 10/063 705/7.11 |
| 2007/0061420 A1* | 3/2007 | Basner .......... G06Q 10/10 709/217 |
| 2010/0125599 A1* | 5/2010 | Cheng ........... G06Q 30/02 707/771 |

FOREIGN PATENT DOCUMENTS

| KR | 1020050056113 A | 6/2005 |
| KR | 100835375 B1 | 6/2008 |

(Continued)

OTHER PUBLICATIONS

English Translation of KR 2010-0022871.*
International Search Report mailed Jan. 24, 2013 for PCT/KR2012/005126.

*Primary Examiner* — Vivek Srivastava
*Assistant Examiner* — Karina J Garcia-Ching
(74) *Attorney, Agent, or Firm* — Hauptman Ham, LLP (57) ABSTRACT

The invention relates to a system, to a server apparatus, to a terminal apparatus, and to a recording medium for generating a user affinity-based address book, and to a method for generating a user affinity-based address book, which support a user so that the user may intuitively recognize an affinity with a number of other users whose contact information is registered in the address book of the user. The invention is implemented such that: that information on a user's address book is provided; the result of a determination on whether or not the same contact number is shared between the user address book and an address book of each person whose contact information is registered, and the duration and frequency of talks between the user and each person whose (Continued)

contact information is registered; and information on a social address book is generated based on the determined affinity.

4 Claims, 5 Drawing Sheets

(51) Int. Cl.
*G06Q 10/10* (2012.01)
*G06Q 50/00* (2012.01)

(58) Field of Classification Search
USPC .......................................................... 709/206
See application file for complete search history.

(56) References Cited

FOREIGN PATENT DOCUMENTS

| KR | 20100022871 A | * | 3/2010 | ............. G06Q 30/02 |
|----|---------------|---|--------|--------------------------|
| KR | 1020100022871 A | | 3/2010 | |
| KR | 1020100054174 A | | 5/2010 | |

* cited by examiner

SYSTEM, SERVER APPARATUS, TERMINAL APPARATUS, AND RECORDING MEDIUM FOR GENERATING A USER AFFINITY-BASED ADDRESS BOOK, AND METHOD FOR GENERATING A USER AFFINITY-BASED ADDRESS BOOK

CROSS REFERENCE TO RELATED APPLICATION

This application claims the priority of Korean Patent Application No. 10-2011-0063108, filed on Jun. 28, 2011 in the KIPO (Korean Intellectual Property Office). Further, this application is the National Phase application of International Application No. PCT/KR2012/005126 filed Jun. 28, 2012, which designates the United States and was published in Korean.

TECHNICAL FIELD

The present invention relates to a system, a server apparatus, a terminal apparatus, and a recording medium for generating a user affinity-based address book that supports to intuitively recognize affinity between a user and a plurality of other people whose contact information is registered in an address book of the user, and a method for generating a user affinity-based address book.

BACKGROUND ART

In the recent years, as the use of portable terminals is increased and information required for a person to memorize is increased, dependency on an address book grows. In addition, with the growth of dependency on an address book, the functions of the address book are diversified.

Meanwhile, such an address book has a plurality of pieces of contact information registered therein that are indicated in a simple arrangement based on a predetermined value, for example, in an alphabetical order or designated numbers in general. Accordingly, such a configuration increases the time and effort required to search for desired contact information among a plurality of pieces of contact information registered in the address book, in proportion to the amount of information registered in the address book.

According to a conventional method of solving such an inconvenience, communications of each contact information recorded in an address book are counted and each contact information is given a weight, and based on the weight, a shortcut icon for contact information having a high frequency of communications is automatically generated on a background of a portable terminal.

However, such a method only improves the approachability to predetermined contact information having a high frequency of communications based on only the number of communications, and has a limitation in predicting the relevance or affinity between a plurality of pieces of contact information registered in the address book and a user.

Another conventional technology provides a technology for cumulatively managing the duration and the number of talks of each contact information registered in an address book, and if a search request for a certain contact information is made by a user, the number and duration of talks occurring during a predetermined period of time are indicated.

However, such a conventional technology only provides the duration and the number of talks, and fails to disclose a method of intuitively recognizing the relationship or the affinity between a plurality of pieces of contact information registered in an address book and a user.

DISCLOSURE

Technical Problem

The present invention is directed to providing, with respect to providing an address book that is used for a user to manage a plurality of pieces of contact information, a system, a server apparatus, a terminal apparatus, and a recording medium for generating a user affinity-based address book that supports to intuitively recognize an affinity between a plurality of other users registered in an address book of a user and the user, and a method for generating a user affinity-based address book.

In particular, the present invention is directed to providing a system, a server apparatus, and a method for generating a user affinity-based address book capable of calculating an affinity between a user and each contact information registered in an address book based on a communication record of each contact information, an association between each contact information, and information on a location of a user corresponding to each contact information, and by use of the calculated affinity, providing information on a social address book in the form of a graph, and a recording medium for implementing the same.

The purposes of the present invention are not limited to the above stated, and other purposes that are not stated above will be clearly understood to those ordinary skilled in the art that will fall within the scope of the present invention from the following description.

Technical Solution

One aspect of the present invention provides a system of generating a user affinity-based address book, the system including: a server apparatus configured to determine an affinity between a user and an acquaintance corresponding to each contact information registered in an address book of the user based on at least one of information regarding whether or not a moving line of the user corresponds to a moving line of the acquaintance corresponding to each contact information registered in the address book of the user, information regarding whether or not same contact information is shared between the user and the acquaintance corresponding to each contact information registered in the address book of the user, a duration of talks between the user and the acquaintance corresponding to each contact information registered in the address book of the user, and a frequency of talks between the user and the acquaintance corresponding to each contact information registered in the address book of the user; and a terminal apparatus configured to provide the server apparatus with information on the address book of the user, and after receiving a result of determination of an affinity between the user and each contact information registered in the address book from the server apparatus, generate information on a social address book based on the received result of determination of the affinity.

Another aspect of the present invention provides a server apparatus including: a communication unit configured to receive information on an address book from a terminal apparatus, and provide the terminal apparatus with information on a social address book; an affinity determination unit configured to determine an affinity between a user of the terminal apparatus and an acquaintance corresponding to each contact information registered in an address book of the user based on at least one of information regarding whether a moving line of the user corresponds to a moving line of the acquaintance corresponding to each contact information registered in the address book of the user, information regarding whether or not same contact information is shared between the user and the acquaintance corresponding to each contact information registered in the address book of the user, a duration of talks between the user and the acquaintance corresponding to each contact information registered in the address book of the user, and a frequency of talks between the user and the acquaintance corresponding to each contact information registered in the address book of the user; and a social address book generation unit configured to generate the information on the social address book based on the affinity determined by the affinity determination unit.

The affinity determination unit may include a relevance calculation unit configured to calculate a relevance between the user and the acquaintance corresponding to each contact information by determining whether or not the moving lines of the user corresponds to the moving line of the acquaintance based on information on a location of the user for each time slot and information on a location of the acquaintance corresponding to each contact information for each time slot, and an association calculation unit configured to determine whether or not same contact information is shared between the user and the acquaintance corresponding to each contact information registered in an address book of the user, and based on the result of determination whether the same contact information is shared, calculate an association between the user and the acquaintance corresponding to each contact information, wherein a duration and frequency of talks between the user and each contact information registered in the address book of the user may be further collected, and based on the collected duration and frequency of talks as well as the calculated association and relevance, the affinity between the user and the acquaintance corresponding to each contact information registered in the address book of the user may be determined.

The server apparatus may further include a location information acquisition unit configured to collect information on a location of the user for each time slot and information on a location of the acquaintance corresponding to each contact information registered in the address book for each time slot during a preset period of time.

The location information acquisition unit may receive the information on the location of the user for each time slot and the information on the location of the acquaintance corresponding to each contact information registered in the address book for each time slot during the preset period of time by making a request of a location information providing apparatus, or receive the information on the location of the user for each time slot and the information on the location of the acquaintance corresponding to each contact information registered in the address book for each time slot during the preset period of time from a terminal apparatus of the user and a terminal apparatus of the acquaintance, respectively.

The social address book generation unit may generate the information on the social address book that represents an affinity between the user and the acquaintance by use of a connection line connecting the user to the acquaintance corresponding to each contact information.

The affinity determination unit may further include a relationship calculation unit configured to calculate a relationship between the user and the acquaintance corresponding to each contact information based on the information on the location of the user for each time slot and information on an address of each contact information registered in the address book of the user, wherein the social address book generation unit may generate the information on the social address book based on the relationship, the relevance, the association, the duration of talks, and the frequency of talks.

Still another aspect of the present invention provides a terminal apparatus for generating a user affinity-based address book, the terminal apparatus including: a collection unit configured to collect at least one of a duration of talks between a user and each contact information registered in an address book of the user, a frequency of talks between the user and each contact information registered in the address book of the user, and information on an address book of an acquaintance corresponding to each contact information registered in the address book of the user; a location information collection unit configured to collect information on a location of the user for each time slot and information on a location of the acquaintance corresponding each contact information registered in the address book for each time slot during a preset period of time; an affinity calculation unit configured to calculate an affinity between the user and the acquaintance corresponding to each contact information registered in the address book of the user based on at least one of information regarding whether or not a moving line of the user corresponds to a moving line of the acquaintance corresponding to each contact information registered in the address book, information regarding whether or not same contact information is shared between the user and the acquaintance, the duration of talks and the frequency of talks between the user and the acquaintance; and a generation unit configured to generate information on a social address book representing an affinity between the user and the acquaintance corresponding to each contact information registered in the address book of the user, based on the affinity calculated by the affinity calculation unit.

The affinity calculation unit may analyze a relevance between the user and each contact information by determining whether or not the moving line of the user corresponds to the moving line of the acquaintance corresponding to each contact information based on the information on the location of the user for each time slot and the information on the location of the acquaintance corresponding to each contact information for each time slot; determine whether or not the same contact information is shared between the user and the acquaintance corresponding to each contact information by comparing the address book of the user with an address book of the acquaintance corresponding to each contact information in the address book of the user, and analyze an association between the user and each contact information depending on a result of the determination; and calculate the affinity by use of the duration of talks, the frequency of talks, the analyzed association, and the analyzed relevance.

The location information collection unit may receive the information on the location of the user for each time slot and the information on the location of the acquaintance corresponding to each contact information registered in the address book for each time slot during the preset period of time by making a request of a location information providing apparatus, or receive the information on the location of the user for each time slot and the information on the location of the acquaintance corresponding to each contact information registered in the address book for each time slot during the preset period of time from the terminal apparatus of the user and a terminal apparatus of the acquaintance corresponding to each contact information, respectively.

Still another aspect of the present invention provides a terminal apparatus for generating a user affinity-based address book, the terminal apparatus including: a collection unit configured to collect at least one of a duration of talks between a user and each contact information registered in an address book of the user, a frequency of talks between the user and each contact information registered in the address book of the user, and information on an address book of an acquaintance corresponding to each contact information registered in the address book of the user; a location information collection unit configured to collect information on a location of the user for each time slot and information on a location of the acquaintance corresponding each contact information registered in the address book for each time slot during a preset period of time; an affinity information request unit configured to transmit the information on the address book and the information on the location for each time slot to a server apparatus to request information on an affinity between the user and the acquaintance corresponding to each contact information registered in the address book from the server apparatus; and a generation unit configured to generate information on a social address book representing an affinity between the user and the acquaintance corresponding to each contact information registered in the address book of the user, based on information on the affinity received from the server apparatus.

The location information collection unit may receive the information on the location of the user for each time slot and the information on the location of the acquaintance corresponding to each contact information registered in the address book for each time slot during the preset period of time by making a request of a location information providing apparatus, or receive the information on the location of the user for each time slot and the information on the location of the acquaintance corresponding to each contact information registered in the address book for each time slot during the preset period of time from the terminal apparatus of the user and a terminal apparatus of the acquaintance, respectively.

Still another aspect of the present invention, a method for generating a user affinity-based address book in a server apparatus includes: receiving information on an address book from a terminal apparatus; determining an affinity between a user of the terminal apparatus and an acquaintance corresponding to each contact information registered in the address book of the user based on at least one of information regarding whether or not a moving line of the user corresponds to a moving line of the acquaintance corresponding to each contact information registered in the address book of the user, information regarding whether or not same contact information is shared between the user and the acquaintance corresponding to each contact information registered in the address book of the user, a duration of talks between the user and the acquaintance corresponding to each contact information registered in the address book of the user, and a frequency of talks between the user and the acquaintance corresponding to each contact information registered in the address book of the user; and generating information on a social address book representing an affinity between the user and the acquaintance corresponding to each contact information registered in the address book of the user based on the determined affinity.

Still another aspect of the present invention provides a computer readable recording medium recording a program, the computer readable recording medium including functions of: receiving information on an address book from a terminal apparatus; determining an affinity between a user of the terminal apparatus and an acquaintance corresponding to each contact information registered in the address book of the user based on at least one of information regarding whether or not a moving line of the user corresponds to a moving line of the acquaintance corresponding to each contact information registered in the address book of the user, information regarding whether or not same contact information is shared between the user and the acquaintance corresponding to each contact information registered in the address book of the user, a duration of talks between the user and the acquaintance corresponding to each contact information, and a frequency of talks between the user and the acquaintance corresponding to each contact information; and generating information on a social address book representing an affinity between the user and the acquaintance corresponding to each contact information based on the determined affinity.

Still another aspect of the present invention provides a computer readable recording medium recording a program, the computer readable recording medium including functions of: collecting information on an address book of an acquaintance corresponding to each contact information registered in an address book of a user; collecting information on a location of the user for each time slot and information on a location of the acquaintance corresponding to each contact information for each time slot during a preset period of time; analyzing a relevance between the user and the acquaintance corresponding to each contact information by determining whether or not a moving line of the user corresponds to a moving line of the acquaintance based on the information on the location of the user for each time slot and the information on the location of the acquaintance corresponding to each contact information for each time slot; and calculating an affinity between the user and the acquaintance corresponding to each contact information by use of a duration of talks between the user and the acquaintance corresponding to each contact information registered in the address book, a frequency of talks between the user and the acquaintance corresponding to each contact information registered in the address book, and the relevance between the user and the acquaintance corresponding to each contact information registered in the address book, and based on the calculated affinity, generating information on a social address book.

Yet another aspect of the present invention provides a computer readable recording medium recording a program, the computer readable recording medium including functions of: collecting information on an address book of an acquaintance corresponding to each contact information registered in an address book of a user; collecting information on a location of the user for each time slot during a preset period of time; requesting information on an affinity between the user and the acquaintance corresponding to each contact information registered in the address book by sending a server apparatus the information on the address book and the information on the location of the user for each time slot; and generating information on a social address book based on the information on the affinity received from the server apparatus.

Advantageous Effects

According to the present invention, an affinity between a user and other user corresponding to each contact information is calculated by use of various types of information on each contact information registered in an address book, for example, a communication record, an association with other contact information, and information on a location of users corresponding to each contact information, and by use of the calculated affinity, information on a social address book is generated so that a user can recognize the relationship between the user and an acquaintance registered in the contact information at a glance.

In particular, according to the present invention, the affinity between a user and other user corresponding to each contact information registered in an address book is calculated, and from the calculated affinity, information on a social address book is generated in the form of a graph and provided, so that the user can more easily identify an acquaintance having a higher affinity among a plurality of pieces of contact information registered in the address book.

MODES OF THE INVENTION

Benefits and characteristics of the present invention and a method for achieving the same are definite when referring to embodiments, which will be described below, along with the accompanied drawings. However, the present invention is not limited to the embodiments disclosed below, but may be implemented in various forms. The embodiments are provided to make the disclosure of the present invention complete while fully delivering the scope of the present invention to those ordinary skilled in the art of the scope of the present invention, and the embodiments are defined simply by the scope of the claims. The same reference numerals are used to refer to the same element throughout the specification.

In the description of the embodiments, the detailed description of related known functions or constructions will be omitted herein to avoid making the subject matter of the present invention ambiguous. In addition, terms which will be described below are defined in consideration of functions in the embodiments of the present invention, and may vary with an intention of a user and an operator or a custom. Accordingly, the definition of the terms should be determined based on overall contents of the specification.

In addition, "information on a social address book" used in the description of embodiments of the present invention represents an address book indicating an indexed affinity between a user and a plurality of pieces of contact information registered in an address book of the user.

Figure 1:
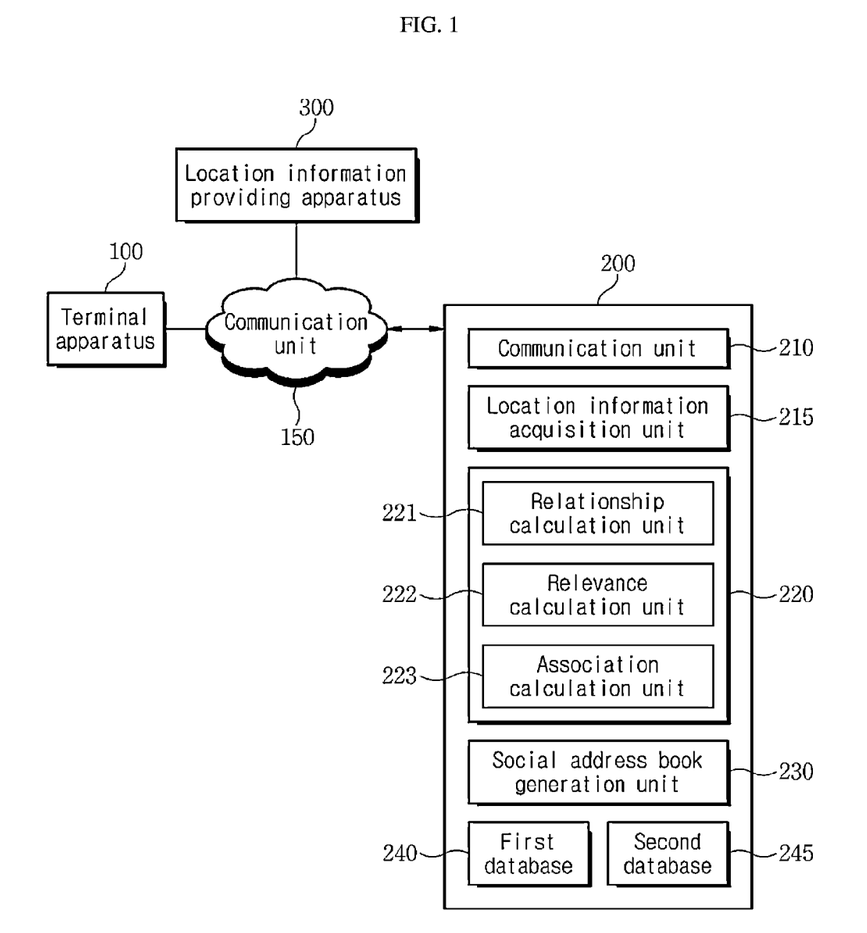
FIG. 1 illustrates a network configuration of a system of generating a user affinity-based address book according to an exemplary embodiment of the present invention.

FIG. 1 illustrates a network configuration of a system of generating a user affinity-based address book according to an exemplary embodiment of the present invention.

Hereinafter, an operation of each part constituting a system for generating a user affinity-based address book according to an exemplary embodiment of the present invention will be described in detail with reference to FIG. 1.

The system for generating a user affinity-based address book according to an exemplary embodiment of the present invention may include a terminal apparatus 100 directly or indirectly connected through a communication network 150 and a server apparatus 200 for generating an address book, and may further include a location information providing apparatus 300.

The terminal apparatus 100 may be implemented using any terminal apparatus of a user using user affinity-based social address book information as long as the terminal apparatus is accessible to the server apparatus 200 through the communication network 150 while having a communication function. For example, the terminal apparatus 100 may be embodied as a desktop personal computer (PC), a notebook personal computer (PC), a tablet personal computer (PC), a smart television (TV), a personal digital assistant (PDA), and a smartphone. Such a terminal apparatus 100 may generate and manage an address book including a plurality of pieces of contact information according to input by a user.

In addition, the terminal apparatus 100 may interoperate with the server apparatus 200 for generating an address book through the communication network 150, and also may share resources with the server apparatus 200.

In detail, the terminal apparatus 100 according to an exemplary embodiment of the present invention provides information on a plurality of pieces of contact information registered in an address book to the server apparatus 200 connected through the communication network 150, and receives information on a social address book generated based on the provided information on the contact information from the server apparatus 200 and outputs the received information so as to be recognized by a user. Here, the information on the contact information is information representing a frequency or state of operations occurring in associated with each contact information, and may include a frequency of talks of each contact information and a cumulative call duration of each contact information. Meanwhile, the information on the social address book may be provided in the form of a graph representing the affinity between the user and each contact information in various forms.

In addition, the terminal apparatus 100, according to a request by the server apparatus 200 for generating an address book, may collect information on a location of the terminal apparatus 100 for each time slot during a preset period of time, and provide the server apparatus 200 with the collected location information. In this case, the information on the location of the terminal apparatus 100 for each time slot may be collected from a location detection member (not shown) such as a global positioning system (GPS) module provided in the terminal apparatus 100.

According to another exemplary embodiment of the present invention, the terminal apparatus 100 may not only provide the server apparatus 200 with contact information required to generate information on social address book information, but also receive a result of determination of affinity between a user and each contact information registered in an address book from the server apparatus 200 and generate information on a social address book based on the received result of determination of affinity.

The server apparatus 200 represents a service apparatus that supports generating information on a user affinity-based social address book according to the present invention, and may be connected to the terminal apparatus 100 and the location information providing apparatus 300 through the communication network 150. Such a server apparatus 200 calculates an affinity between a user and each contact information registered in an address book, based on each contact information registered in the address book basically provided from the terminal apparatus 100, information related to each contact information, and information on a location of a user provided from the terminal apparatus 100 and/or the location information providing apparatus 300, and generates, stores, and manages information on a social address book indicating the calculated affinity as an index number.

That is, the server apparatus 200 for generating the address book according to an exemplary embodiment of the present invention may generate and manage information on a social address book based on an open API. In detail, the server apparatus 200 collects or determines whether or not a moving line of a user corresponds to a moving line of an acquaintance corresponding to each contact information registered in an address book of the user, whether or not same contact information is shared between the address book of the user and an address book of each contact information, a duration of talks between the user and each contact information, and a frequency of talks between the user and each contact information, calculates an affinity between the user and each contact information using a result of the determination, and based on the open API, performs a portion or all of an entire process of generating information on a social address book indicating the calculated affinity between the user and each of a plurality of acquaintances as an index number. Here, the open API represents an application programming interface (API) which is open to the public and anyone can access, and for example, a portion or all of functions of generating information on a social address book including a function to generate information on a social address book, a function to collect various information required for generating information on a social address book, and a function to calculate an affinity may be implemented in the open API to be available for anyone. Accordingly, the terminal apparatus 100 may generate or use a user affinity-based address book by accessing a certain function of the server apparatus 200 through the open API.

The server apparatus 200 for generating the address book includes a communication unit 210, a location information acquisition unit 215, an affinity determination unit 220, a social address book generation unit 230, a first database 240 and a second database 245. In addition, the affinity determination unit 220 may include a relationship calculation unit 221, a relevance calculation unit 222 and an association calculation unit 223.

In addition, a moving line according to the present invention may be defined as a concept of a vector connecting two or more points to a line connecting the two or more points. That is, the server apparatus 200 may operate a direction value of a moving line of the terminal apparatus 100 according to change of the terminal apparatus 100 in position, and the server apparatus 200 may be configured to increase a moving line vector value of the terminal apparatus 100 whenever the terminal apparatus 100 of a certain user represents the same moving line ten times or more.

In this regard, the server apparatus 200 may be configured to determine whether or not moving lines correspond to each other, not only by determining the coincidences of points and lines based on location information collected from two terminal apparatuses or whether or not the points and lines lie within a certain threshold value, but also by mounting an algorithm thereon for determining whether or not moving line vectors collected from two terminal apparatuses correspond to each other or have a similarity within a certain threshold value.

The communication unit 210 receives information on an address book of a user and information related to contact information from the terminal apparatus 100, and may provide the terminal apparatus 100 with information on a social address book that is generated based on the information related to contact information, information on a location of a user for each time slot and location information of each contact information in the address book for each time slot. The information on the address book and the information related to contact information, which are received from the terminal apparatus 100 through the communication unit 210, may be stored in the first database 240.

The location information acquisition unit 215 collects information on a location of a user for each time slot and information on a location of each user corresponding to each contact information registered in the address book for each time slot during a preset period of time. For example, the location information acquisition unit 215 receives information on a location of a user for each time slot and information on a location of each contact information for each time slot from the location information providing apparatus 300, or receives location information collected from a terminal apparatus corresponding to each contact information and the terminal apparatus 100 of a user.

The affinity determination unit 220 is configured to calculate an affinity between a user and each of a plurality of acquaintances registered in an address book of the user from various pieces of information. For example, the affinity determination unit 220 may determine an affinity between a user and an acquaintance corresponding to each contact information based on information, which is determined through comparison of collected location information and indicates whether or not a moving line of the user corresponds to a moving line of each of a plurality of acquaintances registered in an address book of the user, information indicating whether or not same contact information is shared between the user and the acquaintances, a duration of talks between the user and the acquaintances (a cumulative call duration or an average call duration) between the user and the acquaintances, and a frequency of talks between the user and the acquaintances.

In particular, the relationship calculation unit 221 of the affinity determination unit 220 may calculate a relationship between a user and each contact information by comparing information on a location of the user for each time slot with a location of an acquaintance corresponding to each contact information registered in the address book. Here, the location of an acquaintance corresponding to each contact information may be derived from address information included in the contact information. The relationship calculated as such may be used to estimate a relation between a user and an acquaintance based on location. In addition, the relationship as such may be provided to the social address book generation unit 230.

The relevance calculation unit 222 may calculate a relevance based on a matching degree of moving lines between a user and each acquaintance, by comparing information on a location of a user for each time slot with information on a location of an acquaintance corresponding to each contact information registered in an address book of the user, and provide the social address book generation unit 230 with the calculated relevance. For example, an acquaintance whose moving line repeatedly or frequently matches a moving line of a user is more likely to spend time with the user, and thus is considered to have an affinity higher than an acquaintance whose moving line hardly matches the moving line of the user.

The association calculation unit 223 determines whether or not the same contact information is shared by comparing an address book of a user with an address book of each acquaintance corresponding to each contact information. In addition, the association calculation unit 223, depending on a result of determination of sharing of the contact information, calculates an association between the user and each contact information, and provides the calculated association to the social address book generation unit 230.

The social address book generation unit 230 is configured to generate information on a social address book indicating the affinity between a user and each contact information as an index number. To this end, the social address book generation unit 230 manages an open API function to generate information on a social address book, and may generate information on a social address book through an invocation of the open API function. That is, the social address book generation unit 230, upon invocation of the open API function to generate information on a social address book, may make a request of the affinity determination unit 220 to obtain the relationship, the relevance, and the association between a user and an acquaintance corresponding to each contact information registered in an address book of the user, calculate an affinity between the user and each contact number using the obtained relationship, the relevance, the association, and information on contact information as parameters, and generate information on a social address book based on the calculated affinity. Herein, the information on a social address book may represent data indicating an affinity between a user and each contact information as an index number, for example, a social graph.

Figure 2:
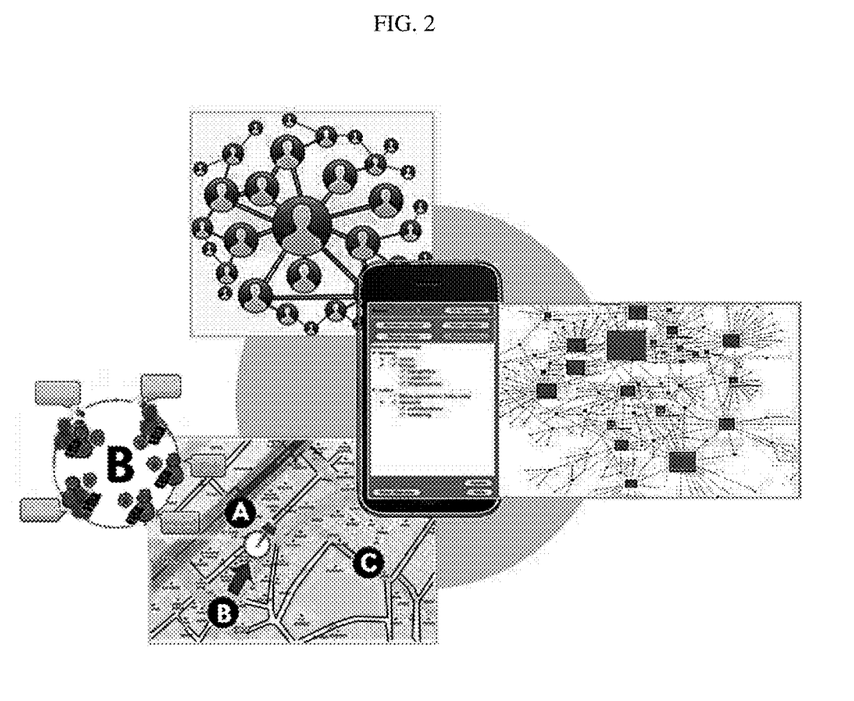
FIG. 2 illustrates information on a user affinity-based social address book generated according to an exemplary embodiment of the present invention.

Referring to FIG. 2, as to describe the social graph in more detail, a user is connected to each contact information using a line whose color or thickness differs according to an affinity between the user and each contact information, thereby generating information on a social address book. Such information on the social address book may be stored in the second database 245.

The information on the social address book may be provided to the terminal apparatus 100 of a user through the communication unit 210.

Each function of the server apparatus 200 for generating an address book having the above configuration may be implemented in the form of a program recorded in a recording medium that is readable by the server apparatus 200. To this end, the recording medium may include an instruction that receives information on an address book from the terminal apparatus 100, determines an affinity between a user and each contact information based on collected results regarding whether or not a moving line of a user of the terminal apparatus 100 corresponds to a moving line of each contact information in address book information of the terminal apparatus 100, whether or not the same number is shared between an address book of the user and an address book of each contact information, the duration of talks between the user and each contact information, and the frequency of talks between the user and each contact information, and based on the determined affinity, generates information on the social address book.

Referring again to FIG. 1, the location information providing apparatus 300 is configured to provide information on a location of a user and/or other acquaintances registered in an address book of the user, for example, a home location register (HLR) of a mobile communication system. The home location register is a database managing information on a terminal, information on service subscription, and location information of mobile communication subscribers in the mobile communication system. Accordingly, the server apparatus 200 according to the present invention may obtain information on a location of a user and/or a plurality of acquaintances registered in an address book of the user while interoperating with a mobile communication system, in particular, a home location register.

Meanwhile, the above exemplary embodiment of the present invention has been described in relation that information on a social address book is generated using an additional apparatus connected through the communication network 150, that is, using the server apparatus 200 for generating information on a social address book. However, the terminal apparatus 100 may directly collect information required to generate information on a social address book, calculate an affinity between a user and contact information, and based on the calculated affinity, generate information on a social address book.

Figure 3:
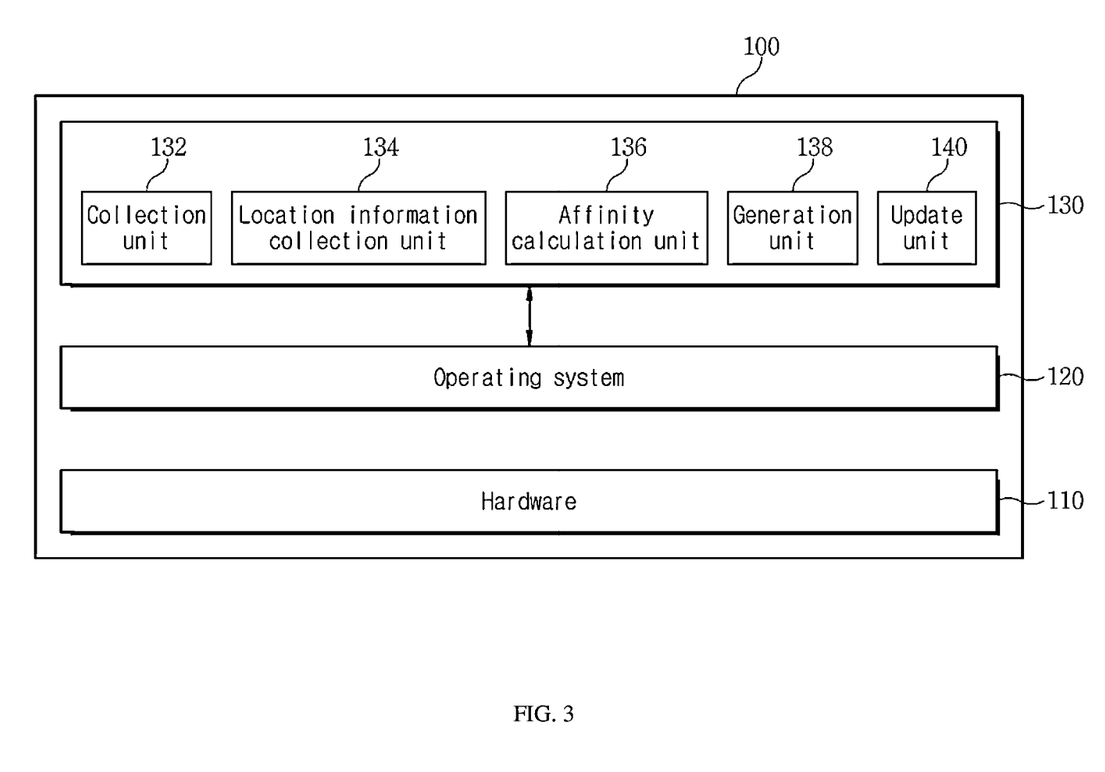
FIG. 3 is a block diagram illustrating configuration of a terminal apparatus for generating an address book according to an exemplary embodiment of the present invention.

FIG. 3 is a block diagram illustrating configuration of the terminal apparatus 100 according to an exemplary embodiment of the present invention. Referring to FIG. 3, the terminal apparatus 100 may include an address book generation module 130 including a collection unit 132, a location information collection unit 134, an affinity calculation unit 136, a generation unit 138, and an update unit 140. Herein, the address book generation module 130 may interoperate with a platform of the terminal apparatus 100, that is, with an operating system 120 and hardware 110 of the terminal apparatus 100, and the address book generation module 130 may be implemented using an open API provided by the operating system 120. That is, the address book generation module 130 invokes a location acquisition API of the operating system 120, and through the invoked API may obtain information on a location of a user corresponding to a preset period of time by use of an apparatus in the hardware 110 (for example, a GPS module). As another example, the address book generation module 130, by invoking an connection API for interoperating with the location information providing apparatus 300, may receive location information corresponding to a preset period of time from the location information providing apparatus 300 through the communication network 150, and based on the received location information of the user and information on contact information, may generate information on a social address book indicating affinity information.

Herein, the operating system 120 represents software to operate a hardware system of the terminal apparatus 100, and consists of various types of programs configured to operate hardware of the terminal apparatus 100, monitor the entire system, and control management and task of data that is to be processed. Examples of the operating system 120 may include Symbian, Windows Mobile 7, Android, Research In Motion (RIM)'s Blackberry, Apple's iPhone, Palm WebOS, Maemo, Meego, and Bada OS.

The hardware 110 inside the terminal apparatus 100 represents hardware apparatuses provided in the terminal apparatus 100 and having various functions. Examples of the hardware 110 may include a storage medium storing address book data having a plurality of pieces of contact information, for example, a memory and hard disk, a GPS module representing a position receiver (not shown), a display device, and an input device.

The address book generation module 130 may represent a program implemented to support generation of information on a social address book according to the present invention by use of an API provided by the operating system 120 described above. Main functions of the address book generation modules 130 are as follows.

The collection unit 132 may collect information on each contact information registered in an address of a user, for example, the frequency and duration of talks of each contact information. Here, the address book of the user may be stored in a storage medium of the hardware 110 of the terminal apparatus 100. The information on contact information may be provided to the generation unit 138 as parameters to generate information on a social address book.

In addition, the collection unit 132 may collect an address book of an acquaintance corresponding to each contact information registered in an address book of a user. For example, the collection unit 132 may make a request of a terminal apparatus of an acquaintance corresponding to each contact information so as to receive an address book stored in the terminal apparatus of the acquaintance and provide the received address book to the affinity calculation unit 136.

The location information collection unit 134 may collect information on a location of a user for each time slot and information on a location of an acquaintance corresponding to each contact information registered in an address of the user for each time slot during a preset period of time. For example, the location information collection unit 134 may collect information on a location of a user for each time slot by use of a positioning API of the operating system 120, that is, by use of a GPS module provided in the terminal apparatus 100. According to another exemplary embodiment of the present invention, the location information collection unit 134 may receive location information of a user and/or an acquaintance corresponding to each contact information from the location information providing apparatus 300 or a terminal apparatus of the acquaintance corresponding to each contact information by use of a connection API of the operating system 120. The location information collected as such is provided to the affinity calculation unit 136 as a parameter to calculate a relationship that is required to generate information on a social address book.

The affinity calculation unit 136 may determine an affinity between a user and an acquaintance corresponding to each contact information based on information, which is determined through comparison of the location information collected by the collection unit 132 and indicates whether or not a moving line of the user corresponds to a moving line of each of a plurality of acquaintances registered in an address book of the user, information indicating whether or not the same contact information is shared between the user and the acquaintances, a duration of talks between the user and the acquaintances (a cumulative call duration or an average call duration), and a frequency of talks between the user and the acquaintances.

In more detail, the affinity calculation unit 136 may calculate a relationship between a user and an acquaintance corresponding to each contact information by analyzing contact information frequently visited by the user based on the collected location information. In addition, the affinity calculation unit 136 determines the matching of moving lines by comparing information on a location of a user for each time slot with information on a location of each of acquaintances corresponding to each contact information for each time slot, and based on the matching of moving lines, calculates a relevance between the user and each contact information. In addition, the affinity calculation unit 136 determines whether or not the same contact information is shared by comparing an address book provided from a terminal apparatus of an acquaintance corresponding to each contact information with an address book of a user stored in the terminal apparatus 100, and analyzes an association between the user and each contact information according to the degree to which contact information is shared.

Further, the affinity calculation unit 136 may calculate an affinity between a user and each contact information based on the above results of analysis, that is, the relationship, the association, and the relevance. That is, the affinity calculation unit 136, while having the relationship, the relevance, the association, and information on contact information as parameters, may invoke an API for generating an address book to calculate an affinity between a user and each contact information, and provide the calculated affinity to the generation unit 138.

The generation unit 138 may generate information on a social address book indicating an indexed affinity between a user and each of a plurality of acquaintances registered in an address book of the user, based on the affinity provided from the affinity calculation unit 136. Here, the information on the social address book is provided in the form of a graph obtained by generating a connection line representing an affinity between a user and each contact information and by connecting a user to each contact information using the connection line. Herein, the affinity may be represented with various forms such as different colors or thicknesses of the connection line.

The update unit 140 may collect information required to generate information on a social address book using the collection unit 132, the location information collection unit 134, and the affinity calculation unit 136 at a preset period of time, and also update the information on the social address book through calculation of the relationship, the association, and the relevance.

Meanwhile, this exemplary embodiment of the present invention has been described in relation that the terminal apparatus 100 collects the association, the relevance, the relationship, and the information on contact information, and analyzes the collected association, relevance, relationship, and information on contact information to generate information on a social address book, but according to another exemplary embodiment of the present invention, the server apparatus 200 may perform some of these functions performed by the terminal apparatus 100 in this embodiment. For example, the terminal apparatus 100 may collect required information, for example, information on an address book of each contact information registered in an address book of a user, and location information of each contact information, transmit the collected information to the server apparatus 200 for generating an address book while requesting the server apparatus 200 to calculate affinity information, and upon request, may generate information on a social address book based on the affinity information received from the server apparatus 200.

Figure 4:
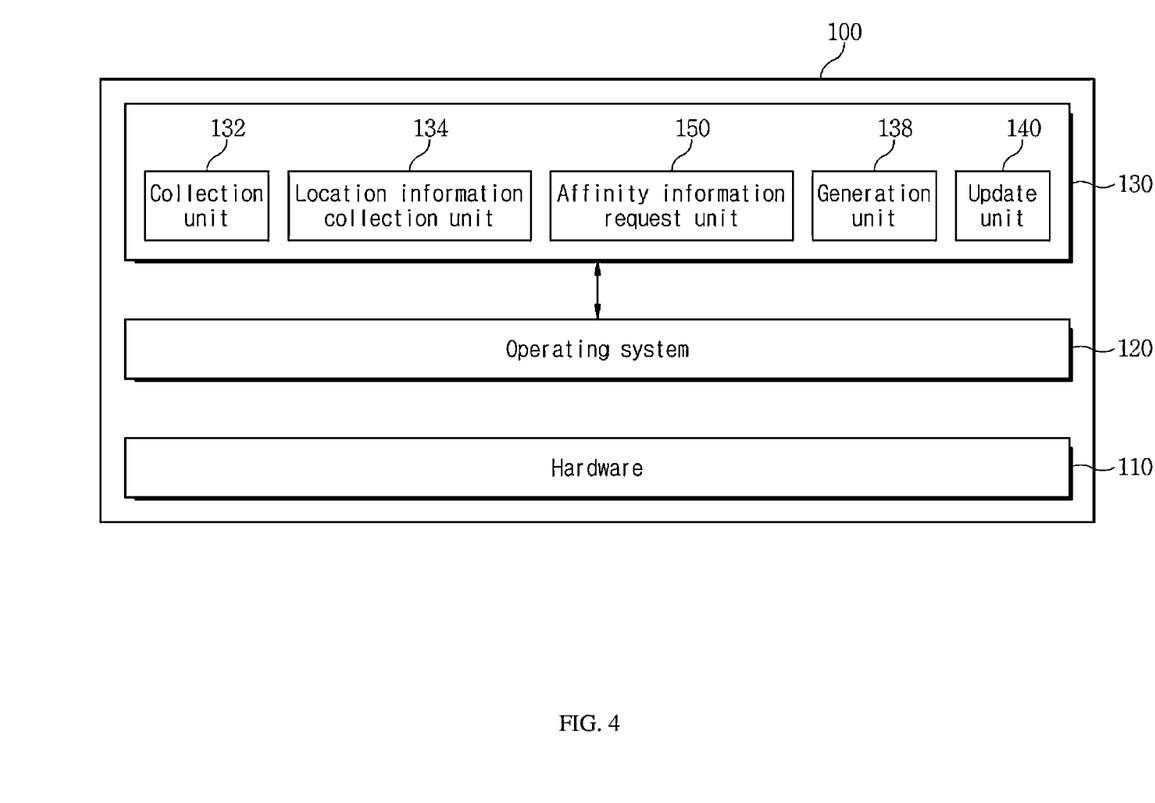
FIG. 4 is a block diagram illustrating configuration of a terminal apparatus for generating an address book according to another exemplary embodiment of the present invention.

As shown in FIG. 4, the above described terminal apparatus 100 according to another exemplary embodiment may include, instead of the affinity calculation unit 136, an affinity information request unit 150 that may send the server apparatus 200 address book information and location information for each time slot to request affinity information.

The address generation module 130 having the above configuration may be implemented as a program recorded in a recording medium readable by the terminal apparatus 100. That is, the program may include an instruction that collects location information of each contact information for each time slot and information on a location of a user for each time slot during a preset period of time and information on contact information, analyzes an affinity based on the location information for each time slot and the information on contact information, and generates information on a social address book by use of the affinity.

In addition, the program recorded in the recording medium may further include an instruction to obtain location information for each time slot and address book information while interoperating with the location information providing apparatus 300 and a terminal apparatus of each contact information, an instruction to calculate a relationship between a user and each contact information based on information on a location of a user for each time slot and address information of each contact information in the address book, an instruction to calculate a relevance between each contact information and a user based on information on a location of a user of the terminal apparatus 100 for each time slot and information on a location of an acquaintance corresponding to each contact information for each time slot, and an instruction to calculate an association between a user and each contact information through comparison between an address book stored in the terminal apparatus 100 and information on an obtained address book.

Meanwhile, the address book generation module 130 according to another exemplary embodiment of the present invention may collect address book information and location information of each contact information in the address book, request affinity information from the server apparatus 200 for generating an address book by use of the collected information, and generate information on a social address book based on the affinity information received upon a request for the affinity information from the server apparatus 200 for generating a social address book. In this case, the program recorded in the recording medium may include an instruction to collect address book information for each contact information in the address book, collect information on a location of a user for each time slot during a preset period of time, transmit the address book information and the location information for each time slot to the server apparatus 200 for generating an address book, request affinity information between a user and each contact information in the address book from the server apparatus 200 for generating an address book, and generate information on a social address book based on the affinity information received from the server apparatus 200 for generating an address book.

Hereinafter, a process of generating information on a social address book according to operation of an address book generation system having the above configuration will be described with reference to FIG. 5.

Figure 5:
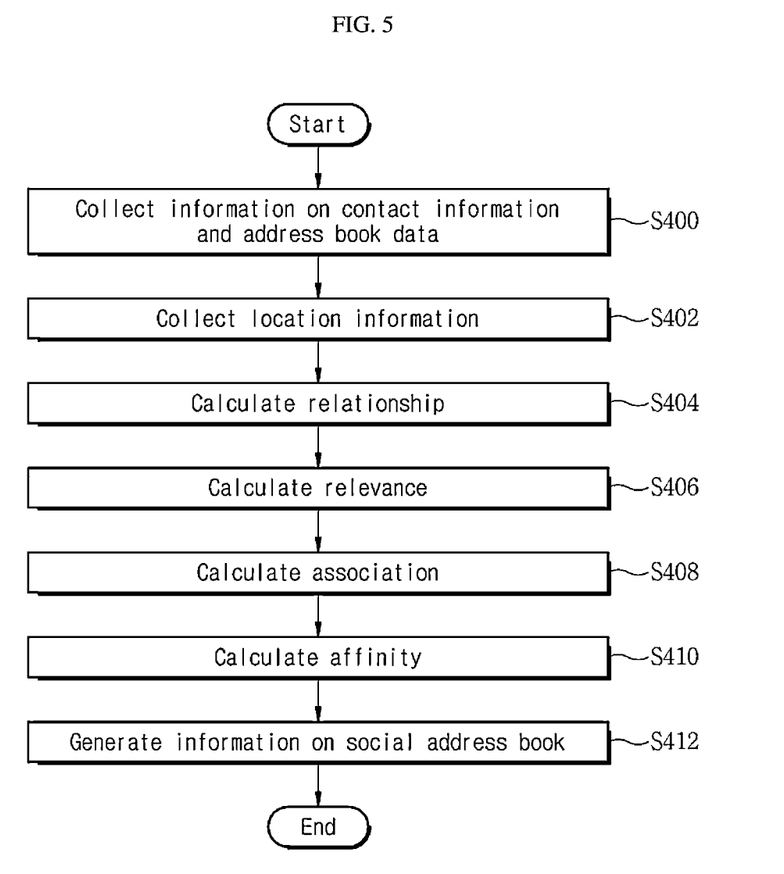
FIG. 5 is a flowchart showing a process of generating a user affinity-based address book according to an exemplary embodiment of the present invention.

FIG. 5 is a flowchart showing a process of generating information on a social address book by an address book generation apparatus according to an exemplary embodiment of the present invention First, as shown in FIG. 5, the server apparatus 200 for generating an address book collects information on contact information including at least one of the frequency of talks and the duration of talks of each contact information registered in address books of a plurality of terminal apparatuses 100 through the communication unit 210, and address books of acquaintances corresponding to each contact information (S400).

In addition, the location information acquisition unit 215 of the server apparatus 200 collects information on a location of a user for each time slot and information on a location of an acquaintance corresponding to each contact information registered in an address book of the user for each time slot during a preset period of time from the location information providing apparatus 300 connected through the communication network 150, the terminal apparatus 100, or a terminal apparatus of an acquaintance registered in the address book of the user (S402).

After the required information is collected as the above, the server apparatus 200 allows the relationship calculation unit 221 to calculate a relationship between a user and each contact information by comparing information on a location of the user for each time slot with address information of each contact information registered in the address book (S404).

In addition, the server apparatus 200 according to an exemplary embodiment of the present invention allows the relevance calculation unit 222 to calculate a relevance between each contact information and a user by determining the matching of moving lines by comparing location information of the user for each time slot with location information of each contact information for each time slot (S406). According to an exemplary embodiment of the present invention, the information on a location of a user for each time slot and the location information of each contact information for each time slot that are required to calculate the relevance may be obtained from the location information providing apparatus 300 or the terminal apparatus 100 of the user and a terminal apparatus of an acquaintance corresponding to each contact information. In this case, each terminal apparatus may provide the server apparatus 200 for generating an address book with information on a location of a user that is collected by use of a GPS module (not shown) embedded in each terminal apparatus during a preset period of time.

In addition, the server apparatus 200 according to an exemplary embodiment of the present invention may allow the association calculation unit 223 to calculate an association between a user and each contact information by determining whether or not the same contact information is shared by comparing information of an address book of the user with information of an address book of each contact information (S408).

Thereafter, the server apparatus 200 for generating an address book allows the social address book generation unit 230 to calculate an affinity between a user and an acquaintance corresponding to each contact information registered in an address book of the user using the relationship, the relevance, the association, and information on contact information as parameters (S410). Here, the affinity calculation may be achieved by assigning a different weight to each of the relationship, the relevance, the association, the frequency of talks and the duration of talks of the information on contact information, and then obtaining a weighted sum of the relationship, relevance, association, frequency of talks, and duration of talks.

Thereafter, the server apparatus 200 according to an exemplary embodiment of the present invention allows the social address book generation unit 230 to generate a connecting line representing the calculated affinity, and generate information on a social address book using the connecting line connecting an acquaintance corresponding to each contact information to a user (S412). The information on a social address book generated as such may be provided to the terminal apparatus 100 of the user through the communication unit 210 of the server apparatus 200. Here, the connecting line may be assigned a different thickness or a different color depending on the degree of affinity.

As is apparent from the above description according to the embodiments of the present invention, an affinity between a user and an acquaintance corresponding to each contact information is calculated by use of various pieces of information on acquaintances corresponding to each contact information registered in an address book of the user, for example, communication record, the relationship with each contact information, the relevance based on location information of users corresponding to each contact information, and the association based on whether the same contact information is shared, and information on a social address book is generated and provided by use of the calculated affinity, so that the relation between a user and an acquaintance corresponding to each contact information registered in an address book of the user is recognized at one glance.

While the invention has been shown and described with reference to certain exemplary embodiments thereof, it will be understood by those skilled in the art that various changes in form and details may be made therein without departing from the spirit and scope of the invention as defined by the appended claims. For example, the indexes of the affinity, the relationship, and the association may be absolute values indicated as a natural number or an integer number, but the present invention is not limited thereto, and thus the indexes may be a relative value indicating a difference between a current index value and a predetermined index value that is randomly set or based on statistics. In addition, the indexes of the affinity, the relationship, the association, etc. each may be divided into ranges and managed in a more simplified index data, such as high, middle, and low.

In addition, a processor mounted on the server apparatus 200 or the terminal apparatus 100 according to the present invention may process a program instruction for executing the method according to the present invention. According to an embodiment, the processor may be a Single-threaded processor. According to another embodiment, the processor may be a Multithreaded processor. In addition, the processor may process instructions stored in a memory or a storage device.

Meanwhile, the memory mounted on the server apparatus 200 or the terminal apparatus 100 stores information in each apparatus. According to an embodiment, the memory is a computer readable medium. According to an embodiment, the memory may be a volatile memory unit, and according to another embodiment, the memory may be a non-volatile memory unit. According to an embodiment, the storage device may be a computer readable medium. According to various other embodiments, the storage device may include a hard disk device, an optical disk device, or other large capacity storage devices.

The server apparatus 200 or the terminal apparatus 100 according to the present invention may operate according to an instruction commanding one or more processors to perform the above described functions and processes. Examples of the instruction include an interpretable instruction, for example, script instructions such as JavaScript or ECMAScript instructions, executable codes, or other instructions stored in a computer readable medium. In addition, the apparatus according to the present invention may be implemented in a distributed fashion over a network, for example, Server Farm, or implemented in a single computer device.

Although configuration of the apparatus is illustrated in the specification and drawings, an embodiment of the functional operation and subject matter described in the specification may be implemented in other types of digital electronic circuits, or implemented in computer software, firmware, or hardware including a structure disclosed in the specification and its equivalent, or implemented in the combination of one or more of these. An embodiment of the subject matter described in the specification may be embodied as one or more computer program products, that is, one or more modules related to a computer program instruction encoded on a program storage medium to control an operation of the apparatus according to the present invention or to be run by the operation. The computer readable medium may be a machine readable storage device, a machine readable storage board, a memory device, a composition of material having exertion on an electric waveform signal readable by a machine, or the combination of one or more of these.

The terms "system" or "apparatus" include a programmable processor, a computer, or all instruments, devices, and machines configured to process data while including a computer or multiprocessor. The system may include a code forming an execution environment for a computer program upon a request, for example, a code constituting processor firmware in cooperation with hardware, a protocol stack, a database management system, an operating system, or the combination of one or more of these.

The computer program (known as programs, software, software applications, scripts, or codes) mounted on the apparatus according to the present invention and executing the method according to the present invention may be written in any form of program languages including a complied language, an interpreted language, a transcendental language, or a procedural language, and may be developed in any form by including an independent program or a module, component, subroutine, or any other unit suitable for use in a computer environment. The computer program does not necessarily correspond to a file of a file system. The program may be stored in a single file provided to a requested program, in interoperating multiple files (for example, files each storing some of one or more modules, lower level programs, or codes) or in a part of a file containing other programs or data (for example, one or more scripts stored in a markup language document). The computer program may be located on a single site or over a plurality of sites in a distributed fashion and developed so as to be executed on multiple computers connected to one another through a communication network or on a single computer.

Examples of a computer readable medium suitable for storing the computer program instruction and data include a semiconductor memory device including an erasable programmable Read-Only Memory (EPROM), an electrically erasable programmable Read-Only Memory (EEPROM), and a flash memory device, and all non-volatile memories, media, and memory devices including a magnetic disk, such as an internal hard disk or an external disk, a magneto-optical disk, and CD-ROMs and DVD-ROMs. A processor and a memory may be supplemented by a specific purpose logic circuit or integrated into a specific purpose logic circuit.

An embodiment of the subject matter described in the specification may be implemented in an operation system including a back-end component, such as a data server, a middle-ware component, such as an application server, a front-end component, such as a client computer having a web browser or a graphic user interface interoperable with the embodiment of the subject matter described in the specification, or the combination of one or more of the back-end component, the middle-end component, and the front-end component. The component of the system may allow interconnection by any form or any medium of digital data communication, such as a communication network.

The specification includes details of a number of specific implements, but it should be understood that the details do not limit any invention or what is claimable in the specification but rather describe features of the specific embodiment. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all the operation be executed. In some cases, a multitasking and a parallel processing may be beneficial. In addition, it should not be understood that the separation of various system components in the above described embodiments is required in all embodiments, and it should be understood that the above described program components and systems may be incorporated into a single software product or may be packaged in multiple software products.

Hereinbefore, embodiments of the subject matter in the specification have been described. Other embodiments are within the scope of the following claims. For example, suitable results may be achieved even if operations cited in the claims are performed in a different order. For example, the process shown in the appended drawings do not necessarily require the illustrated order or a sequential order. In a certain embodiment, a multitasking and a parallel processing may be beneficial.

The description suggests the best mode of the present invention to provide an example that explains the present invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the claims.

INDUSTRIAL APPLICABILITY

The present invention provides information on a social address book generated based on affinity between a user and each contact information, and also may be applied to applications that manage an address book in more various forms.

The invention claimed is:

1. A method for generating a user affinity-based address book in a terminal apparatus including a processor, the method comprising:
collecting information on an address book of an acquaintance corresponding to each contact information registered in an address book of a user of the terminal apparatus;
collecting information on a location of the user for each time slot and information on a location of the acquaintance corresponding to each contact information registered in the address book of the user for each time slot during a preset period of time;
calculating an affinity between the user and the acquaintance corresponding to each contact information registered in the address book of the user based on relevance, an association, a relationship, a duration of talks, and a frequency of talks;
generating information on a social address book representing the calculated affinity between the user and the acquaintance corresponding to each contact information registered in the address book of the user based on the calculated affinity,
wherein the calculating an affinity comprises,
analyzing the relevance between the user and the acquaintance corresponding to each contact information registered in the address book of the user by determining whether or not a moving line of the user corresponds to a moving line of the acquaintance based on the information on a location of the user for the each time slot and the information on a location of the acquaintance for the each time slot,
analyzing the association by determining whether or not same contact information is shared between the user and the acquaintance corresponding to each contact information registered in the address book of the user by comparing the address book of the user with an address book of the acquaintance,
analyzing the relationship between the user and the acquaintance corresponding to each contact information registered in the address book of the user based on the information on the location of the user for the each time slot and information on an address of each contact information registered in the address book of the user, and
collecting the duration of talks between the user and the acquaintance and the frequency of talks between the user and the acquaintance, and
wherein the information on the social address book indicates each affinity between the user and each contact information as an indexed data by use of a connection line whose color or thickness differs according to the each affinity between the user and each contact information.

2. A method for generating a user affinity-based address book in a server apparatus, including one or more processors, the method comprising:
receiving information on an address book from a terminal apparatus;
collecting, from a location information providing apparatus or the terminal apparatus, information on a location of a user of the terminal apparatus for each time slot and information on a location of an acquaintance corresponding to each contact information registered in the address book for each time slot during a preset period of time;
determining an affinity between the user of the terminal apparatus and the acquaintance corresponding to the each contact information registered in the address book of the user based on relevance, an association, a relationship, a duration of talks and a frequency of talks; and
generating information on a social address book representing the determined affinity between the user and the acquaintance corresponding to each contact information registered in the address book of the user based on the determined affinity, wherein the determining an affinity comprises,
calculating the relevance between the user and the acquaintance by determining whether or not a moving line of the user corresponds to a moving line of the acquaintance corresponding to each contact information registered in the address book of the user based on the information on the location of the user for the each time slot and the information on the location of the acquaintance for the each time slot,
calculating the association by determining whether or not same contact information is shared between the user and the acquaintance corresponding to each contact information registered in the address book of the user by comparing the address book of the user with an address book of the acquaintance,
calculating the relationship between the user and the acquaintance corresponding to each contact information registered in the address book of the user based on the information on the location of the user for the each time slot and information on an address of each contact information registered in the address book of the user, and
collecting the duration of talks between the user and the acquaintance and the frequency of talks between the user and the acquaintance, and
wherein the information on the social address book indicates each affinity between the user and each contact information as an indexed data by use of a connection line whose color or thickness differs according to the each affinity between the user and each contact information.

3. A non-transitory computer readable recording medium recording a program, when executed by a server apparatus, the server apparatus to execute:
receiving information on an address book from a terminal apparatus;
collecting, from a location information providing apparatus or the terminal apparatus, information on a location of a user of the terminal apparatus for each time slot and information on a location of an acquaintance corresponding to each contact information registered in the address book for each time slot during a preset period of time;
determining an affinity between the user of the terminal apparatus and the acquaintance corresponding to each contact information registered in the address book of the user based on relevance, an association, a relationship, a duration of talks, and a frequency of talks; and
generating information on a social address book representing the affinity between the user and the acquaintance corresponding to each contact information based on the determined affinity,
wherein the determining an affinity comprises,
calculating the relevance between the user and the acquaintance corresponding to each contact information registered in the address book of the user by determining whether or not a moving line of the user corresponds to a moving line of the acquaintance based on the information on the location of the user for the each time slot and the information on the location of the acquaintance for the each time slot,
calculating the association by determining whether or not same contact information is shared between the user and the acquaintance corresponding to each contact information registered in the address book of the user by comparing the address book of the user with an address book of the acquaintance,
calculating the relationship between the user and the acquaintance corresponding to each contact information registered in the address book of the user based on the information on the location of the user for the each time slot and information on an address of each contact information registered in the address book of the user, and
collecting the duration of talks between the user and the acquaintance and the frequency of talks between the user and the acquaintance, and
wherein the information on the social address book indicates each affinity between the user and each contact information as an indexed data by use of a connection line whose color or thickness differs according to the each affinity between the user and each contact information.

4. A non-transitory computer readable recording medium recording a program, when executed by a terminal apparatus, the terminal apparatus to execute:
collecting information on an address book of an acquaintance corresponding to each contact information registered in an address book of a user of the terminal apparatus;
collecting information on a location of the user for each time slot and information on a location of the acquaintance corresponding to each contact information for each time slot during a preset period of time;
calculating an affinity between the user and the acquaintance corresponding to each contact information registered in the address book of the user based on relevance, an association, a relationship, a duration of talks, and a frequency of talks;
generating information on a social address book representing the calculated affinity between the user and the acquaintance corresponding to each contact information registered in the address book of the user based on the calculated affinity,
wherein the calculating an affinity comprises,
analyzing the relevance between the user and the acquaintance by determining whether or not a moving line of the user corresponds to a moving line of the acquaintance corresponding to each contact information registered in the address book of the user based on the information on the location of the user for the each time slot and the information on the location of the acquaintance for the each time slot,
analyzing the association by determining whether or not same contact information is shared between the user and the acquaintance corresponding to each contact information registered in the address book of the user by comparing the address book of the user with an address book of the acquaintance,
analyzing the relationship between the user and the acquaintance based on the information on the location of the user for the each time slot and information on an address of each contact information registered in the address book of the user, and
collecting the duration of talks between the user and the acquaintance and the frequency of talks between the user and the acquaintance, and
wherein the information on the social address book indicates each affinity between the user and each contact information as an indexed data by use of a connection line whose color or thickness differs according to the each affinity between the user and each contact information.

* * * * *